US011616899B1

(12) United States Patent
Dhanda et al.

(10) Patent No.: US 11,616,899 B1
(45) Date of Patent: Mar. 28, 2023

(54) IN-FIELD MONITORING OF AUTOFOCUS PERFORMANCE AND INSTABILITY MITIGATION IN CAMERA SYSTEMS

(71) Applicant: Apple Inc., Cupertino, CA (US)

(72) Inventors: Abhishek Dhanda, San Ramon, CA (US); Yunfeng Li, Fremont, CA (US); Santiago Alban, Mountain View, CA (US); Andrew D. Fernandez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/483,719

(22) Filed: Sep. 23, 2021

Related U.S. Application Data

(60) Provisional application No. 63/090,582, filed on Oct. 12, 2020.

(51) Int. Cl.
*H04N 5/00* (2011.01)
*H04N 5/232* (2006.01)

(52) U.S. Cl.
CPC .............................. *H04N 5/23212* (2013.01)

(58) Field of Classification Search
CPC ...................................................... H04N 5/00
See application file for complete search history.

(56) References Cited

U.S. PATENT DOCUMENTS

| 8,229,292 | B2 | 7/2012 | Hamada et al. |
| 10,194,074 | B2 | 1/2019 | Kinoshita |
| 2008/0002033 | A1 | 1/2008 | Ito et al. |
| 2019/0146179 | A1* | 5/2019 | Kwon ................ H02K 41/0356 359/823 |

* cited by examiner

*Primary Examiner* — Maryam A Nasri
(74) *Attorney, Agent, or Firm* — Robert C. Kowert; Kowert, Hood, Munyon, Rankin & Goetzel, P.C.

(57) ABSTRACT

A camera system may include one or more controllers to perform in-field monitoring of autofocus performance and instability mitigation. The controllers may monitor one or more parameters associated with adjustment of a relative position between a lens group and an image sensor and/or one or more images. The controllers may analyze the parameters and/or images to calculate various metrics. The controllers may evaluate the metrics with respect to corresponding thresholds. The controllers may detect, based at least in part of the evaluation the metrics, one or more instability events associated with controller performance degradation. In response to detecting the instability events, the controllers may perform one or more remedial actions to mitigate the controller performance degradation.

20 Claims, 7 Drawing Sheets

IN-FIELD MONITORING OF AUTOFOCUS PERFORMANCE AND INSTABILITY MITIGATION IN CAMERA SYSTEMS

This application claims benefit of priority to U.S. Provisional Application Ser. No. 63/090,582, entitled "In-field Monitoring of Autofocus Performance and Instability Mitigation in Camera Systems," filed Oct. 12, 2020, and which is hereby incorporated herein by reference in its entirety.

BACKGROUND

Technical Field

This disclosure relates generally to a camera system and more specifically to a camera system capable of in-field monitoring of autofocus performance and instability mitigation.

Description of the Related Art

Mobile multipurpose devices such as smartphones, tablet, and/or pad devices are considered as a necessity nowadays. They integrate various functionalities in one small package, thus providing tremendous convenience for use. Most, if not all, of today's mobile multipurpose devices include at least one camera. The advent of the mobile multipurpose devices has resulted in a high requirement for the cameras, not only in terms of quality but also reliability and availability. Therefore, it is desirable to have a camera system capable of detecting problems in-field and performing corrections as needed.

Figure 1:
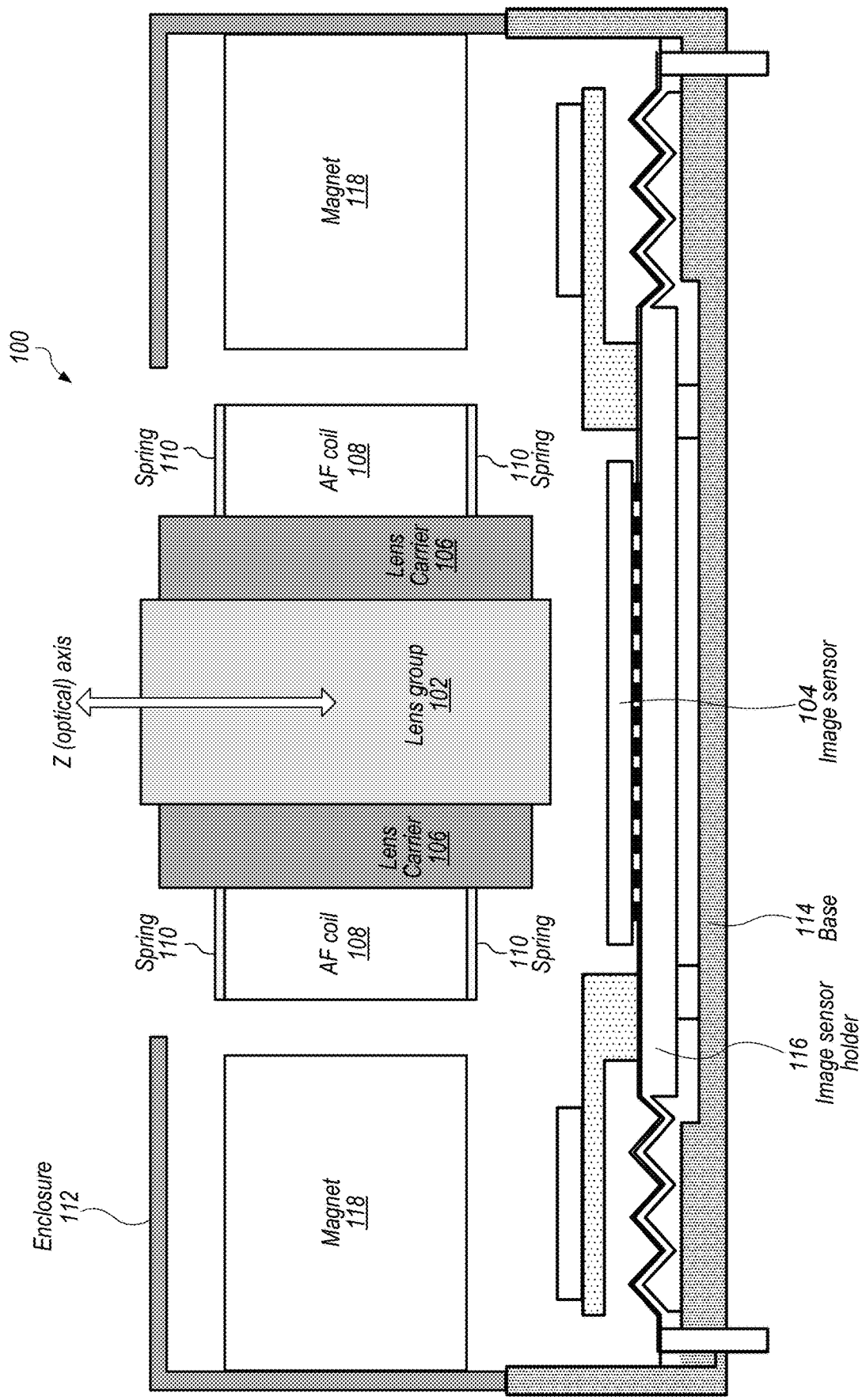
FIG. 1 shows an example camera system, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a camera system capable of in-field monitoring of autofocus performance and instability mitigation. In some embodiments, the camera system may include a lens group having one or more lenses, an image sensor, at least one actuator, and one or more controllers. In some embodiments, the lens group may define an optical axis (or Z-axis) which indicates at least part of the optical path for light from the environment passing through the lens group to the image sensor. In some embodiments, the one or more controllers may control the actuator to move one or more movable components (e.g., the lens group, the image sensor, or both) to control a relative position between the lens group and the image sensor. Therefore, the one or more controllers, actuator, movable component(s), and associated sensor(s) altogether may be viewed as a motion control system for the camera system.

In some embodiments, the actuator may include a voice coil motor (VCM). In some embodiments, the controllers may regulate one or more electrical input (e.g., current, voltage, and/or power) applied to the actuator to control the position of the movable component. In some embodiments, the control of the relative position between the lens group and the image sensor may implement various autofocus (AF) functions. For instance, in some embodiments, the lens group may be movable, e.g., as one single rigid body, whilst the image sensor may be stationary or not movable by the actuator. Accordingly, by moving the lens group from one position to another, the lens group may be able to focus the light passing through the lens group from the environment on to an image plane at the image sensor. In turn, the image sensor may generate image data, e.g., electronic signals, based on the light to form images. In some embodiments, the camera system may be integrated as part of a mobile multipurpose device.

In some embodiments, the camera system may be subject to various instability events associated with performance degradation of the motion control system. For instance, in some embodiments, the camera system may use a viscoelastic material (e.g., gel, grease, etc.) to provide passive damping for motion control of the movable component. In some embodiments, the viscoelastic material may be held in a small container, and some component(s) of the camera systems may extend at least partially in to the viscoelastic material. However, in an instability event, the viscoelastic material may be spilt out of the container and thus cause detachment of those component(s) from the viscoelastic material. In some embodiments, this may cause a change (e.g., reduction) to the damping, which may in turn affect behavior of the motion control system and performance of the autofocus. In some embodiments, the one or more instability events may include detachment of viscoelastic material (as described above), broken spring(s) (which may be used, e.g., to provide suspension(s)), accumulation of electrostatic charges (which may cause variation and/or nonlinearity in operation of the motion control system), and/or other changes in system gain(s) or dynamic range.

In some embodiments, the camera system may monitor one or more parameters associated with control of the relative position between the lens group and image sensor. For instance, the camera system may monitor the position of the movable component (e.g., the lens group and/or the image sensor), and/or the electric input (e.g., current, voltage, and/or power) applied to the actuator during steady state(s) and/or transient(s). In some embodiments, the camera system may also monitor images captured by the camera system. In some embodiments, the camera system may perform various analysis of the monitored parameters and/or image data to detect instability events. For instance, as described above, detachment of viscoelastic material may change the damping for the motion control system, which may be detected by evaluating a dynamic response of the movable lens group (and/or image sensor) and/or a change of the quality of captured image frames (e.g., blur, jitter, and/or shake). Accordingly, the controllers may calculate an overshoot or perform a spectral analysis of the position and/or electric input to detect a change of damping and/or natural frequency of the motion control system. In another example, in some embodiments, the fracture of a spring may cause the lens group to tilt off the original optical axis, which may be detected by analyzing the tracking error between a monitored position and a desired or target position. In some embodiments, the analysis of the parameters may include calculating metrics such as a tracking error, a variation (e.g., a standard deviation around a mean value), an overshoot, a root-mean-square (RMS) value, a spectrum, and the like for individual ones of the monitored parameters. In some embodiments, the analysis of the image data may include calculating metrics such as a spatial frequency resolution (SFR), a modulation transfer function (MTF), and the like to identify change of the image quality and/or defocus of the camera system.

In some embodiments, in response to detecting an instability event, the camera system may perform one or more remedial actions to switch the previous position control schema to another scheme in order to mitigate the controller performance degradation. For instance, when the camera system detects detachment of the viscoelastic material, the controllers may modify one or more gain(s) of the motion control system, such that the natural frequency and/or damping may be adjusted to compensate for the change caused by the detachment. In another example, when the camera system detects an instability event associated with electrostatic charges, e.g., at or near one or more end points in an allowable position range of the movable component, the controllers may modify the allowable range (e.g., reduce the range) to prevent the movable component from approaching those positions (e.g., the end points) vulnerable to the electrostatic charges' effects. In some embodiments, the camera system may further store information of the in-field monitoring and instability mitigation, e.g., in a memory space. This way, when the camera system turns on next time, the camera system may use the historical records to start directly with configurations including previous remedial actions, without have to performing at least some of the previous detection actions. This can further improve the reliability and availability of the camera system and increase the operating efficiency.

FIG. 1 shows an example camera system, according to some embodiments. In this example, in some embodiments, camera system 100 may include lens group 102, image sensor 104, an actuator, and one or more controllers (not shown). In some embodiments, lens group 102 may include one or more lenses, which may be fixedly coupled with lens carrier 106. For instance, lens carrier 106 may include interior threads, through which the one or more lenses of lens group 102 may be screwed on to lens carrier 106. As shown in FIG. 1, lens group 102 may define an optical axis (or Z-axis) which may indicate at least part of the optical path for light from the environment passing through lens group 102 to image sensor 104. In some embodiments, the actuator of camera system 100 may include one or more AF coils 108. In some embodiments, AF coils 108 may be packaged inside a coil holder which may be further fixedly coupled with lens carrier 106. In other words, lens group 102, lens carrier 106, and AF coils 108 may all be fixedly coupled with each other to form one single rigid body to move together. In some embodiments, the actuator of camera system 100 may further include one or more magnets 118 fixedly coupled with enclosure 112 of camera system 100. In some embodiments, enclosure 112 may be further fixedly coupled with base 114 of camera system 100. In some embodiments, camera system 100 may include one or more springs 110 which may extend from the holder of AF coils 108 to magnets 118. As a result, springs 110 may flexibly suspend lens group 102 (lens carrier 106 and AF coils 108) from magnets 116 and base 114.

In some embodiments, image sensor 104 may be fixedly coupled with base 114 through image sensor holder 116. For instance, image sensor 104 may be mounted to image sensor holder 116 using a chip socket and soldering. Therefore, in this example, image sensor 104 and magnets 118 may be viewed as stationary components as they may be fixedly coupled with base 114, whilst lens group 102 and AF coils 108 may be viewed as movable components as they may be flexibly suspended from base 114. In some embodiments, AF coils 108 and magnets 118 may be arranged proximate with each other. Therefore, the electrical input applied to the actuator, e.g., regulatable current flowing through AF coils 108, may interact with the magnetic field of magnets 118 to create motive force (e.g., Lorentz force) to move AF coils 108 (and lens group 106) relative to magnets 118 (and image sensor 104), e.g., along the optical axis (or Z-axis).

In some embodiments, camera system 100 may include one or more sensors to provide feedback signals associated with control of the relative position between lens group 102 and image sensor 104. For instance, the sensors may measure the position of the lens group and/or the electrical input applied to AF coils 108 of the actuator. Based on the feedback signals, the controllers may perform a closed-loop control to calculate a command for the electrical input (e.g., current) and regulate the electrical input (e.g., current) according to the command for controlling the motive force (e.g., Lorentz force) so as to move the lens group 102 to the desired or target position. For purposes of illustration, in this example, lens group 102 may be movable, whilst image sensor 102 may be stationary. As described above, in some embodiments, the movable component may include an image sensor, a lens group, or both of the two components.

As described above, a camera system (e.g., camera system 100 in FIG. 1) may be subject to various instability events associated with and indicative of performance degradation of the motion control system. For instance, in some embodiments, the camera system may use a viscoelastic material (e.g., gel, grease, etc.) to provide passive damping for motion control of the movable component. In some embodiments, the viscoelastic material may be held in a container, and some component(s) coupled with the movable component may extend at least partially in to the viscoelastic material. Given its viscosity, the viscoelastic material may be used as a natural damper. However, in some embodiments, those component(s) may become detached from the viscoelastic material. For instance, a sudden drop of the camera system may spill the viscoelastic material out of the container, and thus cause detachment of the component(s) from the viscoelastic material. In some embodiments, this may change (e.g., reduce) the damping of the motion control system and may ultimately cause instability of the motion control system. Besides the detachment of viscoelastic material, in some embodiments, the camera system may be also subject to instability events such as broken spring(s), accumulation of electrostatic charges, and/or other changes in system gain(s) or dynamic range.

Figure 2:
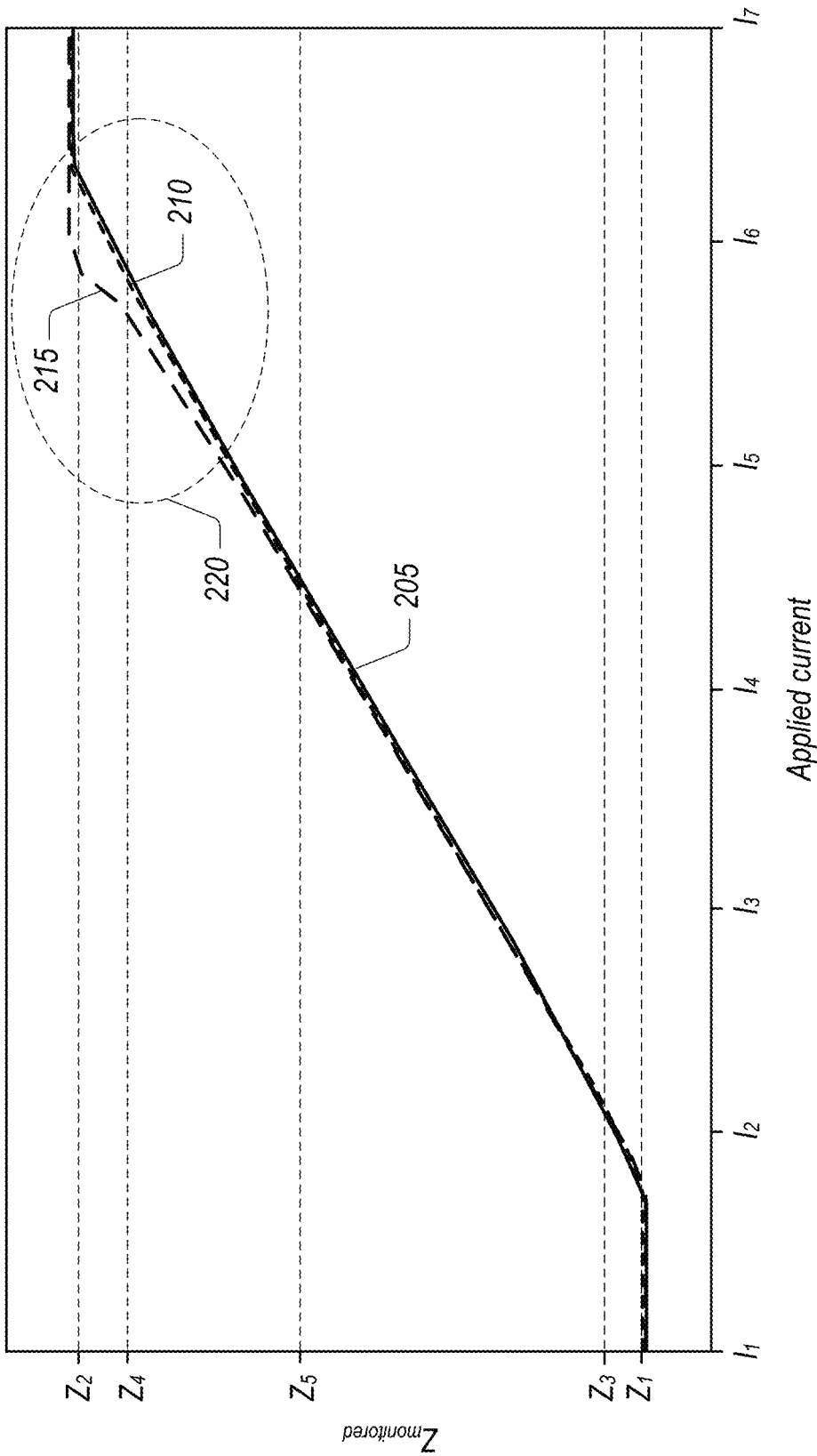
FIG. 2 shows an example instability event of a camera system, according to some embodiments.

FIG. 2 shows an example instability event of a camera system, according to some embodiments. In this example, X-axis represents current applied to an actuator of the camera system (e.g., camera system 100 in FIG. 1), and Y-axis represents a monitored position of a movable component of the camera system. For purposes of illustration, in this example, it is assumed that the movable component may be the lens group. In FIG. 2, curve 205 represents a profile of the desired or target position for the lens group, curve 210 shows moving of the lens group (e.g., the monitored position of the lens group) in a healthy state, and curve 215 depicts moving of the lens group after detachment of a viscoelastic material. In this disclosure, the term "monitored position" is mainly used for distinguishing from the target portion which the lens group is supposed (under control of the motion control system) to reach. The "monitored position" may broadly refer to a position calculated based on measurement from one or more position sensors, a position estimated using one or more models, or a position determined based on a combination of sensor measure and model estimation. In FIG. 2, as shown by curve 205, the lens group may be commanded to move from position Z1 to Z2. As shown by curves 205 and 210, when the motion control system operates normally, the lens group may follow the command to substantially track the target profile. In addition, in a majority of the motion range for the lens group (e.g., between Z3 and Z4), the motion control system may be considered behaving linearly. However, after the detachment occurs, the monitored position may deviate from the target position, as indicated by curves 205 and 215, and possess more nonlinear behaviors, as indicated by circle 215. As a result, the linear region may reduce to a narrower range (e.g., reduced to between Z3 and Z5).

Figure 3:
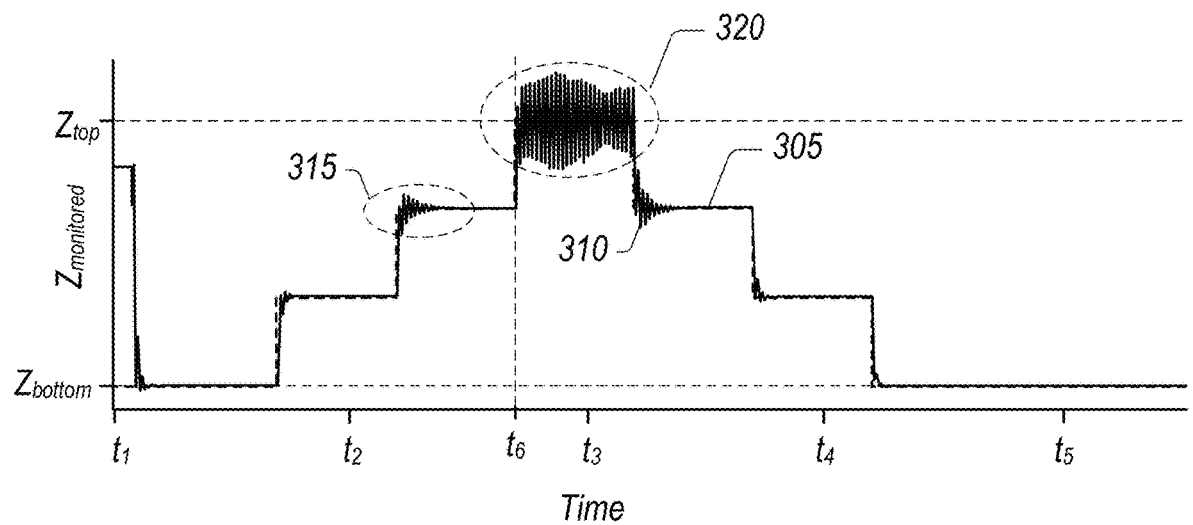
FIG. 3 shows another example instability event of a camera system, according to some embodiments.
Figure 3:
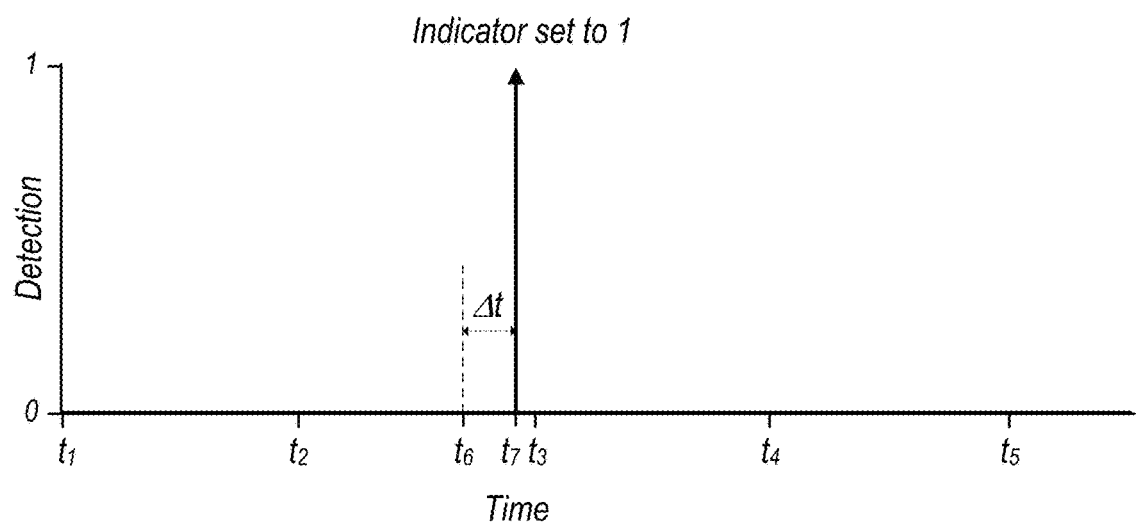

FIG. 3 shows another example instability event of a camera system, according to some embodiments. As shown in FIG. 3, in the upper plot, X-axis represents time, and Y-axis represents a monitored position of a movable component of the camera system (e.g., camera system 100 in FIG. 1). For purposes of illustration, in this example, it is again assumed that the movable component may be the lens group. In some embodiments, the camera system may use an indicator, e.g., a binary bit, to indicate detection of an instability event. In the bottom plot, X-axis represents time, and Y-axis represents the value of the binary bit. When an instability event is detected, the binary bit may be set to 1. Conversely, when no instability event is detected, the binary bit may be cleared to 0. As shown in FIG. 3, curve 305 represents a profile of the desired or target position for the lens group (e.g., a staircase waveform), whilst curve 310 represents the monitored position of the lens group. In this example, the lens group is commanded to come across an entire allowable range from a bottom end point $Z_{bottom}$ to a top end point $Z_{top}$. As shown by curves 305 and 310, the lens group may be controlled, following the command, to track the command moving to the target positions for most of the time. Although curve 310 includes some transients, such as the oscillations indicated by circle 315, the magnitudes of these transients may be relatively small and last only for a relatively short period of time. Therefore, they may not be sufficient to trigger an instability detection alarm, as shown in the bottom plot.

However, when the lens group approaches the top end point $Z_{top}$ (e.g., starting from time $t_6$), the lens group may experience relatively large and persistent oscillations, as indicated by circle 320. But after the lens group leaves $Z_{top}$, the behavior of the motion control system may return to normal. In some embodiments, this phenomenon may be caused by electrostatic charges at or near the end point $Z_{top}$. The electrostatic charges may cause a change to gain(s) of the motion control system and thus result in instabilities. In some embodiments, such an instability event may be detected based on analysis of the monitoring position of the lens group, e.g., by calculating metrics such as a tracking error (e.g., a difference between the monitored position and target position) during a steady state at $Z_{top}$. Here, because the monitored position oscillates, the steady state may instead be identified according to the profile of the target position, as indicated by curve 305. An shown in this example, the indicator is set to 1 (e.g., at time $t_7$) when the calculated tracking error exceeds a threshold for a certain duration of time $\Delta t$. In some embodiments, this duration of time $\Delta t$ may be adjustable to modify the detection sensitivity (e.g., decrease $\Delta t$ to shorten the detection time) and/or reliability (e.g., increase $\Delta t$ to mitigate a false detection). Further, because different instability events may cause different abnormal phenomena, in some embodiments, the camera system may detect and use different indicators to identify different types of instability events.

Additionally, or alternatively, the camera system may monitor the electrical input and/or command of the electrical input applied to the actuator associated with control of the relative position between the lens group and the image sensor. Depending on what electrical input is regulated by the motion control system, the electrical input may include current (e.g., when the motion control system operates in a current-control mode), voltage (e.g., when the motion control system operates in a voltage-control mode), and/or power (e.g., when the motion control system operates in a power-control mode). In some embodiments, the electrical input may be determined based on measurement of one or more sensors (e.g., current and/or voltage sensors). In some embodiments, the electrical input command may be calculated by the controllers of the motion control system in the closed-loop system and thus become available at least within the control firmware. In some embodiments, the camera system may also monitor images by the camera system.

In some embodiments, the camera system may perform various analysis on individual ones of the monitored parameters and/or images. In some embodiments, the analysis may include calculating various metrics. For instance, regarding the monitored position of a movable component, the camera system may calculate a tracking error (e.g., a difference between the monitored position and a target position during a steady state and/or a transient (as described above in FIG. 3), an overshoot of the monitored position during a transient (e.g., in which the lens group moves or is commanded to move dynamically from one position to another), a RMS value of the tracking error, and/or a spectrum of the monitored position indicating harmonics of the monitored position in a frequency domain. In some embodiments, the overshoot may be calculated based on the excess the monitored parameter over its steady-state target value. In some embodiments, the RMS value may be calculated based on a non-recursive average, a recursive average, or some other approaches. In some embodiments, the spectrum may be calculated based on a Fourier analysis. In addition, in some embodiments, for the monitored electrical input and/or electrical input command, the camera system may calculate a variation (e.g., a standard deviation) and/or a spectrum of the monitored electrical input and/or electrical input command. Moreover, in some embodiments, regarding the monitored images, the camera system may calculate a spatial frequency resolution (SFR), a modulation transfer function (MTF), and the like. The SFR and/or MTF may indicate quality and sharpness of an image and thus may be used to identify deterioration of the image quality (e.g., blur, jitter, and/or shake) and/or defocus of the camera system. In some embodiments, the SFR and/or MTF may be calculated for individual frames or a group of frames.

In some embodiments, the camera system may detect one or more instability events based at least in part on analysis of the monitored parameters and/or images. For instance, the camera system may compare one or more of the above calculated metrics with corresponding thresholds. In some embodiments, the thresholds may be specified by a manufacture or a user during the original design or configuration of the camera system. In some embodiments, the thresholds may be "learnt" by the motion control system based on operating histories, e.g., using one or more machine learning algorithms. In some embodiments, the camera system may determine detection of an instability event when one or more of the metrics exceeds their corresponding thresholds. In some embodiments, the camera system may also include one or more durations of time, as needed, to modify the detection sensitivity and/or reliability. For instance, as illustrated in FIG. 3, when the tracking error between the monitored position and target position of the lens group at or near $Z_{top}$ exceeds a threshold persistently over a specified duration of time (e.g., $\Delta t$), the camera system may determine that the motion control system is out of control and thus an instability event is detected. Similarly, in some embodiments, the camera system may evaluate the change of SFR and/or image quality over multiple frames and use the temporal information to detect an instability or defocus event. For instance, in some embodiments, fracture of spring(s) may tilt the lens group off the original optical axis. In some embodiments, this may cause constant defocus of the camera system regardless of how the movable component (e.g., a lens group) is positionally adjusted. Therefore, when the camera system detects defocus based at least in part on evaluation of the image data, e.g., over a period of time, the camera system may determine that there may be broken spring(s).

In some embodiments, it may be important for the camera system to combine the analysis of a plurality of parameters and/or images in order to make instability detections. For instance, in some embodiments, in face of an instability event, the movable component (e.g., a lens group) may still move to the target position, however, the electrical input (e.g., current) applied to the actuator may be observably different from an expected value and/or the quality of the image may deteriorate. Therefore, analysis of the monitored position alone might not, but analysis of the monitored position and electrical input together, may be able to identify the instability event. Accordingly, in some embodiments, the camera system may be able to correlate different parameters and/or images with each other. For instance, the camera system may map one monitored position to a specific electrical input and/or image, and vice versa, based on timestamps of the parameters and/or images or some other information. In addition, in some embodiments, the camera system (e.g., as part of a mobile multipurpose device) may experience some sudden movement which may affect analysis of some of the above parameters and/or images and thus may potentially cause a false detection. To improve the reliability, in some embodiments, the camera system may use data from one or more inertial measurement units (IMUs) (e.g., an accelerometer, a gyroscope, etc.) to detect such sudden movement, and in response temporarily deactivate or pause analysis of some of the above parameters and/or images and/or calculation of some of the above metrics.

In some embodiments, in response to detecting an instability event, a camera system (e.g., camera system 100 in FIG. 1) may perform one or more remedial actions to mitigate the controller performance degradation associated with the instability problem. In some embodiments, the camera system may switch from a previous position control scheme to another position control scheme. For instance, the camera system may modify the gain(s), operating frequency, and/or sampling frequency of the control algorithm to switch "virtually" from one controller to another controller. For instance, as described above, the detachment of a viscoelastic material may change the damping. Accordingly, in response to detecting the detachment, the camera system may modify the gain(s), e.g., a proportional gain and/or an integral gain of a proportional-integral (PI) controller of the control algorithm, to shift the natural frequency and/or adjust the damping of the motion control system. This may compensate for the change caused by the detachment to bring the system back to stable. In some embodiments, after detachment, the viscoelastic material may flow back to the container. Thus, in some embodiments, the camera system may continuously monitor operations of the motion control system. When it detects recovery of the viscoelastic material, the camera system may re-modify the gain(s) to virtually switch back to the previous controller. In another example, as shown in FIG. 3, when the camera system detects instability caused by electrostatic charges, e.g., at one or more end stops (e.g., end stop $Z_{top}$), the camera system may modify (e.g., reduce) the allowable range for position of the movable component (e.g., the lens group) to prevent the movable component approaching the corresponding end stops.

Figure 4:
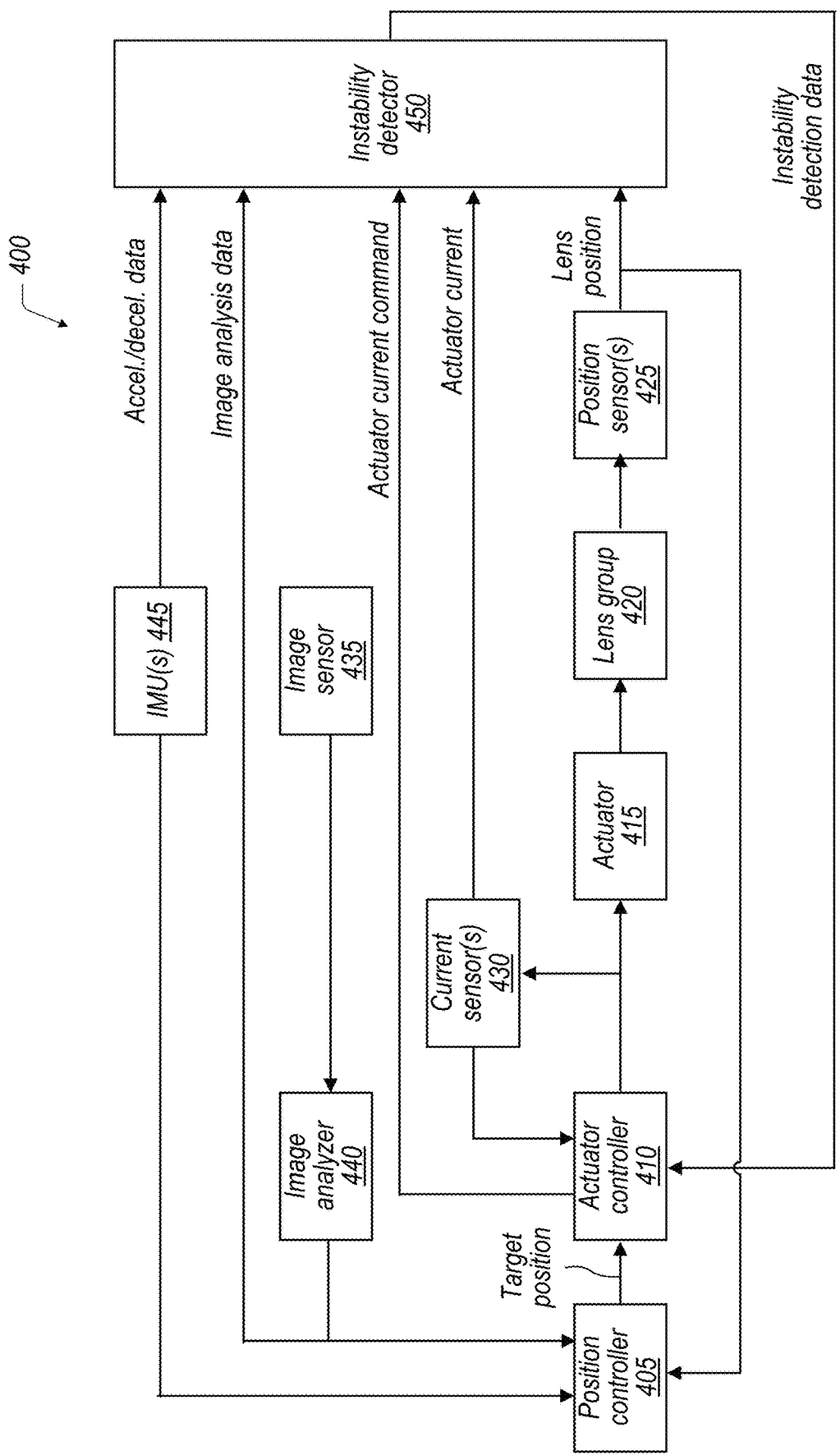
FIG. 4 is a schematic diagram showing operations of an example motion control system of a camera system, according to some embodiments.

FIG. 4 is a schematic diagram showing operations of an example motion control system of a camera system, according to some embodiments. In this example, it is assumed that the movable component under control may be a lens group. However, as described above, in some embodiments, the movable component may include a lens group, an image sensor, or a combination of both. In addition, in this example, it is assumed that an actuator may be controlled by regulating the current applied to the actuator. Again, as described above, the electrical input regulated for the actuator may include current, voltage, and/or power. Further, in this example, it is assumed that the position of the movable component (e.g., a lens group) may be monitored based on measurement data from one or more position sensor(s). As described above, in some embodiments, the monitored position of the movable component may be obtained based on measurement, model estimation, or a combination of both.

Referring to FIG. 4, in some embodiments, motion control system 400 of a camera system (e.g., the camera system described above in FIGS. 1-3) may include one or more controllers (e.g., position controller 405, actuator controller 410, and/or instability detector 450), actuator 415, a movable component (e.g., lens group 420), and one or more sensors (e.g., position sensor(s) 425, current sensor(s) 430). In some embodiments, motion control system 400 may operate together with other components (e.g., image analyzer 440, image sensor 435, and/or IMU(s) 445) to perform (1) motion control of lens group 420 (relative to image sensor 435) for autofocus and (2) in-field monitoring of autofocus performance and instability mitigation. As shown in FIG. 4, the motion control portion may include two closed loops. For instance, in an outer loop, position controller 405 may calculate a target position based at least in part on data from position sensor(s) 425 (e.g., the lens position data), image analyzer 440 (e.g., the image analysis data), and IMU(s) 445 (e.g., the acceleration and/or deacceleration data). In some embodiments, position controller 405 may provide the target position, as a reference, to actuator controller 410. In an inner loop, actuator controller 410 may regulate current applied to actuator 415 based at least in part on the reference and data from current sensor(s) 430 (e.g., the measured current applied to actuator 415). As a result, the current applied to actuator 415 may get regulated and generate required motive force (e.g., Lorentz force) for moving lens group 420 to the commanded target position.

In some embodiments, motion control system 400 may perform the in-field monitoring of autofocus performance and instability mitigation using instability detector 450. As described above, in some embodiments, instability detector 450 may monitor various parameters associated with control of the position of lens group 420 and/or images captured by image sensor 435. For instance, instability detector 450 may monitor the position of lens group 420 (e.g., using position sensor(s) 425), current applied to actuator 415 (e.g., using current sensor(s) 430), command of the current applied to actuator 415 (e.g., from actuator controller 410), and/or image analysis data (e.g., from image analyzer 440). In some embodiments, instability detector 450 may perform various analysis of individual ones of the monitored parameters and/or images to calculate various metrics. For instance, regarding the monitored position, the camera system may calculate a tracking error (e.g., a difference between the monitored position and a target position during a steady state and/or a transient, an overshoot of the monitored position during a transient, an RMS value of the tracking error, and/or a spectrum of the monitored position. In addition, in some embodiments, for the monitored actuator current and/or actuator current command, the camera system may calculate a variation (e.g., a standard deviation) and/or a spectrum of the monitored current and/or current command. Moreover, in some embodiments, regarding the monitored images, the camera system may calculate a spatial frequency resolution (SFR), a modulation transfer function (MTF), and the like to identify a change of image quality (e.g., blur, jitter, and/or shake) and/or defocus of the camera system. Note that in some embodiments, the above described analysis of the images may be performed by image analyzer 440 (rather than instability detector 450), and as a result, instability detector 450 may receive directly the calculated metrics, e.g., SFR, MTF, deterioration of image quality (e.g., blur, jitter, and/or shake), and/or defocus evaluation results, from image analyzer 440. Further, as described, to improve detection reliability, instability detector 450 may also obtain acceleration and/or deacceleration detection data from IMU(s) 445. In some embodiments, instability detector 450 may purposefully deactivate or pause analysis of some of the above parameters and/or images and/or calculation of some of the above metrics in response to detection of a sudden movement of the camera system.

Moreover, as described above, in some embodiments, instability detector 450 may detect one or more instability events based at least in part on analysis of the monitored parameters and/or images. For instance, instability detector 450 may compare one or more of the above calculated metrics with corresponding thresholds. In some embodiments, the thresholds may be specified by a manufacture or a user during the original design or configuration of the camera system. In some embodiments, the thresholds may be "learnt" by the motion control system based on operating histories, e.g., using one or more machine learning algorithms. In some embodiments, instability detector 450 may determine detection of an instability event when one or more of the metrics exceeds their corresponding thresholds. In some embodiments, instability detector 450 may also include one or more durations of time (e.g., the above described Δt in FIG. 3) to modify the detection sensitivity and/or reliability. Similarly, in some embodiments, instability detector 450 may evaluate the change of SFR and/or image quality over multiple frames and use the temporal information to detect an instability or defocus event.

Referring back to FIG. 4, instability detector 450 may provide instability detection data to actuator controller 410 which may in turn perform one or more remedial actions in response to detection of an instability event. In some embodiments, actuator controller 410 may switch from a previous position control scheme to another position control scheme. For instance, actuator controller 410 may modify the gain(s), operating frequency, and/or sampling frequency of its control algorithm (e.g., related at least to the inner loop) to switch virtually from one controller to another controller. In another example, actuator controller 410 may modify the safe operating region for one or more of the monitored parameters (e.g., an allowable range of the current applied to actuator 415). In some embodiments, the switch of the position control scheme may include changing from a closed-loop control scheme to an open-loop control scheme. For instance, actuator controller 410 may open the inner loop, e.g., excluding the data from current sensor(s) 430 (e.g., the measured current applied to actuator 415) from the calculation of the current applied to actuator 415. As described above, in some embodiments, instability detector 450 may detect and thus use different indicators to identify different types of instability events. Accordingly, actuator controller 410 may selectively perform one or more specific remedial actions to mitigate a particular instability event.

Note that, for purposes of illustration, FIG. 4 shows that instability detector 450 provides the instability detection data only to actuator controller 410. In some embodiments, the instability detection data may be provided also to other controllers, e.g., position controller 405. Accordingly, as a result, all the controllers receiving the instability detection data may operate together to mitigate the detected instability event. For instance, when position controller 405 receives the instability detection data from instability detector 450, position controller 405 may modify the gain(s), operating frequency, and/or sampling frequency of its control algorithm (e.g., related at least to the outer loop), modify the safe operating region for one or more of the monitored parameters (e.g., an allowable position range of lens group 420), and/or switch the outer loop to an open loop (e.g., excluding data from position sensor(s) 425 (e.g., the lens position data) from the calculation of the target position). In some embodiments, instability detector 450 and/or actuator controller 410 may also store data of the instability detection and/or remedial actions, e.g., in a memory space, for future use. Note that for purpose of illustration, position controller 405, actuator controller 410, instability detector 450, and image analyzer 440 are shown as separate blocks. In some embodiments, some or all of these components may be implemented using separate hardware, or alternatively be integrated into one single hardware component.

Figure 5:
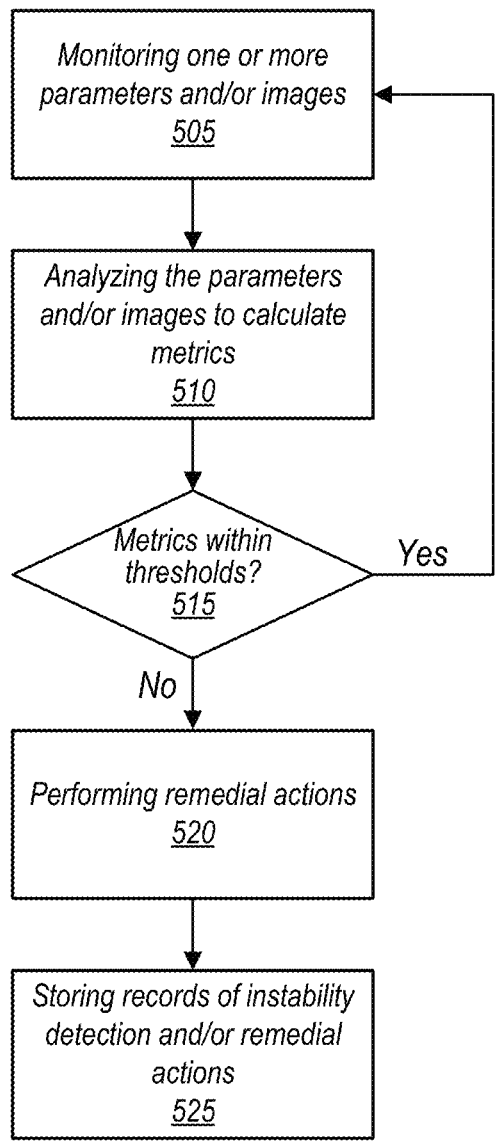
FIG. 5 is a high-level flowchart illustrating a method for performing in-field monitoring of autofocus performance and instability mitigation, according to some embodiments.

FIG. 5 is a high-level flowchart illustrating a method for performing in-field monitoring of autofocus performance and instability mitigation, according to some embodiments. In example, in some embodiments, the method may include monitoring one or more parameters associated with control of a relative position between a lens group and an image sensor and/or one or more images by a camera system (e.g., the camera system described above in FIGS. 1-4), as indicated by block 505. As described above, the parameters may include a monitored position of a movable component and/or an electrical input (and/or electrical input command) applied to an actuator. In some embodiments, the method may include analyzing the one or more parameters and/or images to calculate various metrics, as indicated by block 510. As described above, in some embodiments, the analysis of the parameters may include calculating metrics such as a tracking error, a variation (e.g., a standard deviation around a mean value), an overshoot, a root-mean-square (RMS) value, a spectrum, and the like for individual ones of the monitored parameters. In some embodiments, the analysis of the image data may include calculating metrics such as a spatial frequency resolution (SFR), a modulation transfer function (MTF), and the like to identify deterioration of image quality and/or defocus of the camera system.

Referring back to FIG. 5, in some embodiments, the method may include evaluating the metrics with respect to corresponding thresholds, as indicated by block 515. As described above, in some embodiments, the thresholds may be determined by a manufacturer or a user, or may be acquired during operation. In some embodiments, the evaluation of the metrics may include comparing the metrics with their corresponding thresholds. In some embodiments, when a metric exceeds the corresponding threshold, the evaluation may include examining whether the metric falls outside the threshold for a specified duration of time, depending on the detection sensitivity and/or reliability requirements.

In some embodiments, when the metrics do not exceed the thresholds and/or when the excess of the metrics out of the thresholds does not last for the specified duration of time, the method may return to continuously monitoring the parameters and/or images, as indicated by block 505. Conversely, when one or more of the metrics fall beyond the threshold, with or without a duration of time, one or more instability events associated with controller performance degradation may be detected, and the method may include performing one or more remedial actions to mitigate the controller performance degradation, as indicated by block 520. As described above, in some embodiments, the remedial actions may include switching from one position control scheme for the motion control system to another position control scheme. In some embodiments, the switch of the position control scheme may include modifying gain(s), operating frequency, and/or sampling frequency of a motion control algorithm to switch virtually from one motion controller to another controller. In some embodiments, the switch of the position control scheme may include may include modifying a safe operating region for one or more of the monitored parameters (e.g., an allowable position range of the movable component, an allowable range of the electrical input applied to the actuator, and the like). As described, in some embodiments, the camera system may detect and thus use different indicators to identify different types of instability events. Accordingly, the camera system may selectively perform different remedial actions to mitigate different instability events. In some embodiments, the method may include storing records of instability detection and/or remedial actions, as indicated by block 525.

Figure 6:
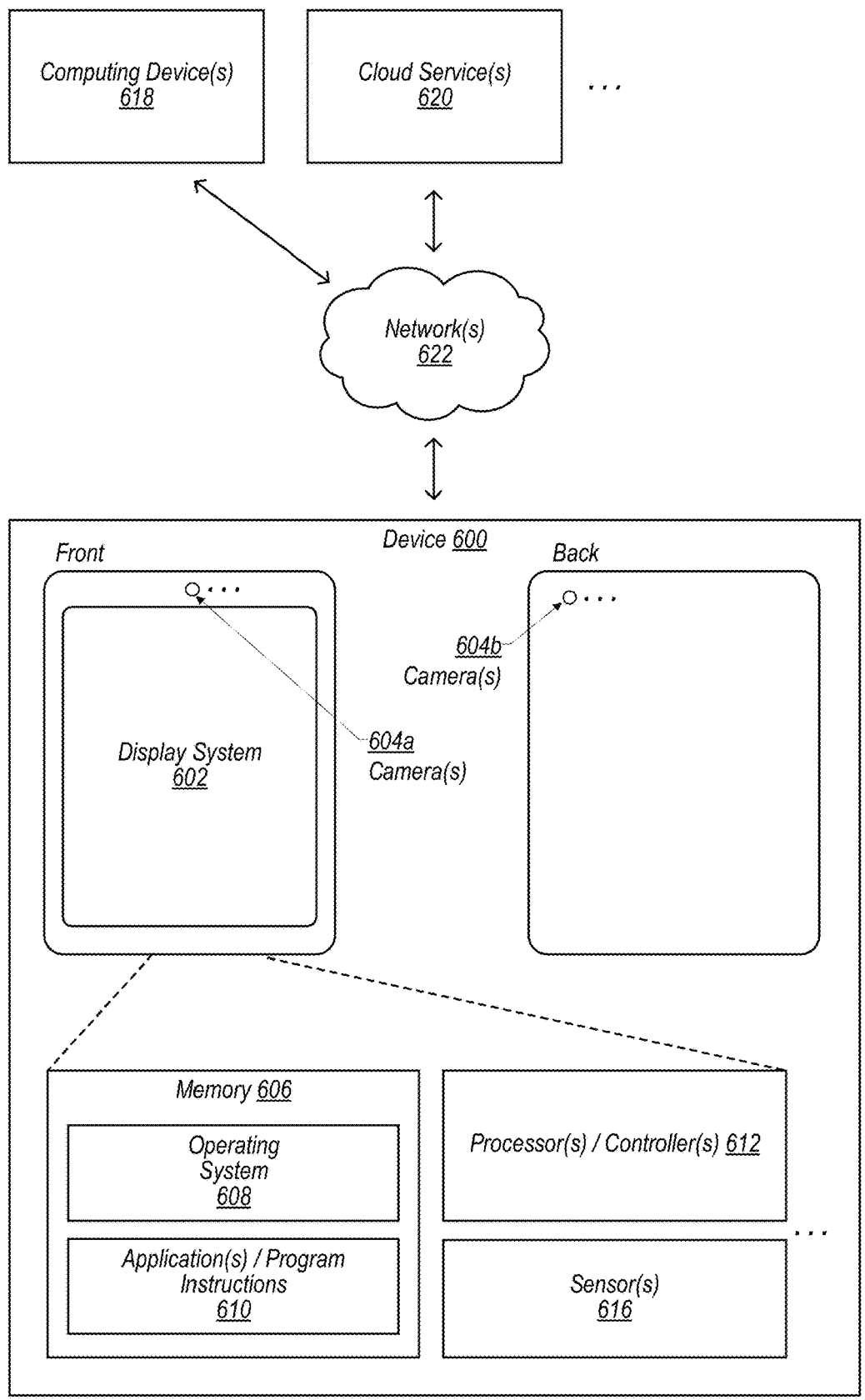
FIG. 6 illustrates a schematic representation of an example device that may include a camera system capable of in-field monitoring of autofocus performance and instability mitigation, according to some embodiments.

FIG. 6 illustrates a schematic representation of an example device 600 that may include a camera system (e.g., the camera system in FIGS. 1-5) capable of in-field monitoring of autofocus performance and instability mitigation, according to some embodiments. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 6. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 616 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 710) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
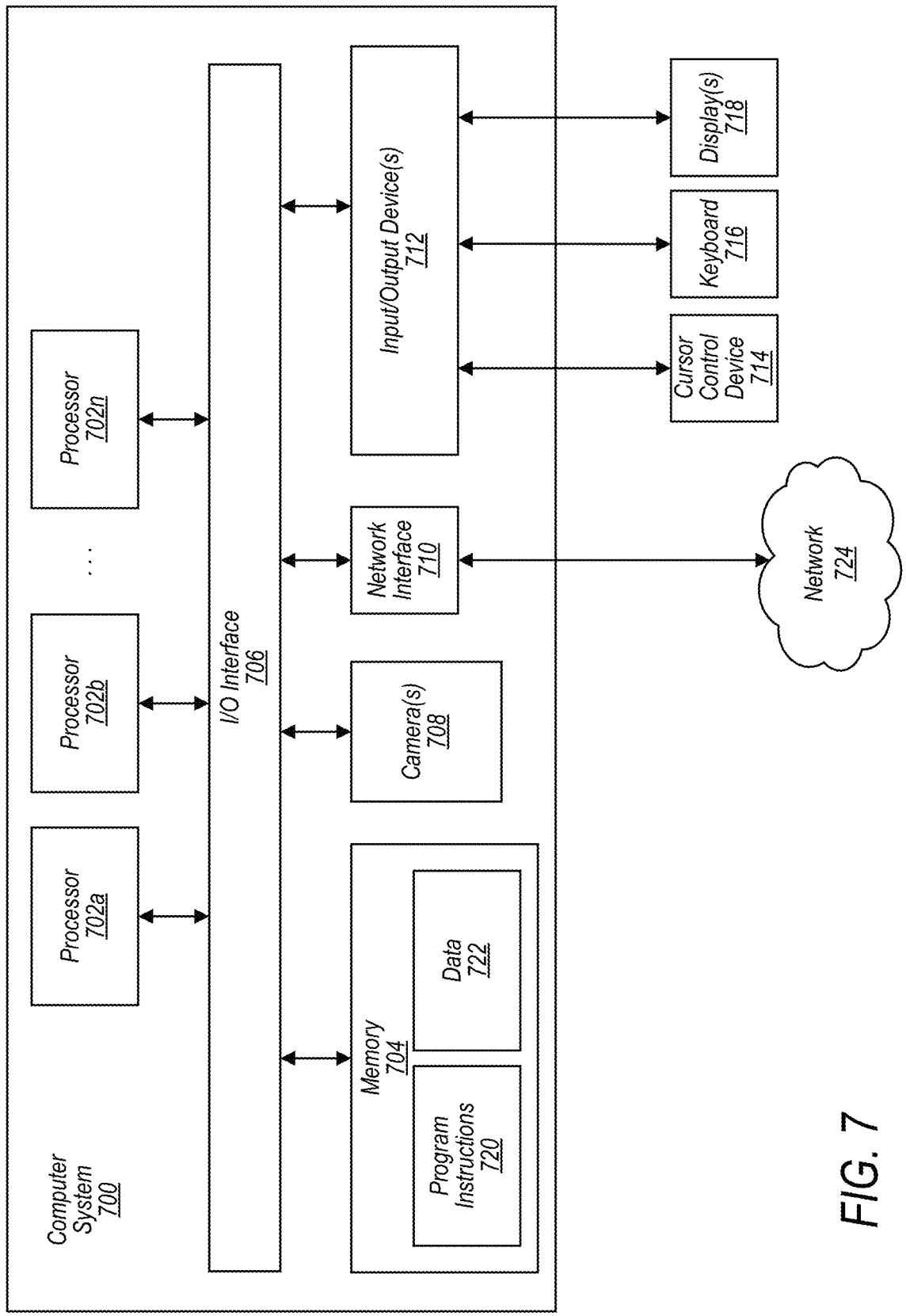
FIG. 7 illustrates a schematic block diagram of an example computer system that may include or host embodiments of a camera system capable of in-field monitoring of autofocus performance and instability mitigation, according to some embodiments.

FIG. 7 illustrates a schematic block diagram of an example computing device, referred to as computer system 700, that may include or host embodiments of a camera system capable of in-field monitoring of autofocus performance and instability mitigation, e.g., as described herein with reference to FIGS. 1-6, according to some embodiments. In addition, computer system 700 may implement methods for controlling operations of the camera and/or for performing image processing images captured with the camera. In some embodiments, the device 600 (described herein with reference to FIG. 6) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a lens group including one or more lenses;
    an image sensor configured to generate image data based on light passing through the lens group;
    an actuator configured to move at least one of the lens group or the image sensor; and
    a control system comprising at least one controller, wherein the control system is configured to:
        control a relative position between the lens group and image sensor, wherein, to control the relative position, the at least one controller controls the actuator in accordance with a first position control scheme;
        monitor one or more parameters associated with the control of the relative position;
        detect, based at least in part on analysis of the one or more parameters, one or more instability events associated with controller performance degradation; and responsive to detecting the one or more instability events, switch from the first position control scheme to a second position control scheme, wherein the at least one controller controls the actuator differently using the second position control scheme relative to the first position control scheme.

2. The system of claim 1, wherein to monitor the one or more parameters, the control system is configured to monitor the relative position between the lens group and image sensor.

3. The system of claim 2, wherein to perform the analysis of the one or more parameters, the control system is configured to determine a difference between the monitored relative position and a target relative position between the lens group and image sensor.

4. The system of claim 2, wherein to perform the analysis of the one or more parameters, the control system is configured to determine an overshoot of the monitored relative position between the lens group and image sensor.

5. The system of claim 2, wherein to perform the analysis of the one or more parameters, the control system is configured to determine a root-mean-square (RMS) value of a difference between the monitored relative position and a target relative position between the lens group and image sensor.

6. The system of claim 2, wherein to perform the analysis of the one or more parameters, the control system is configured to determine a spectrum of the monitored relative position between the lens group and image sensor.

7. The system of claim 1, wherein to monitor the one or more parameters, the control system is configured to monitor at least one of a current applied to the actuator or a command of the current applied to the actuator.

8. The system of claim 7, wherein to perform the analysis of the one or more parameters, the control system is configured to determine a standard deviation of at least one of the current applied to the actuator or the command of the current applied to the actuator.

9. The system of claim 7, wherein to perform the analysis of the one or more parameters, the control system is configured to determine a spectrum of at least one of the current applied to the actuator or the command of the current applied to the actuator.

10. The system of claim 1, wherein the control system is further configured to obtain analysis of the image data generated by the image sensor, and wherein the one or more instability events are detected also based at least in part on the analysis of the image data.

11. The system of claim 10, wherein the analysis of the image data includes a spatial frequency resolution (SFR) for at least one an image frame generated based on the image data from the image sensor.

12. The system of claim 10, wherein the analysis of the image data includes analyzing a change of the SFR from one image frame to another image frame.

13. The system of claim 1, wherein to switch from the first position control scheme to the second position control scheme, the control system is configured to modify an allowable moving range for at least one of the lens group or the image sensor.

14. The system of claim 1, wherein to switch from the first position control scheme to the second position control scheme, the control system is configured to modify a gain of an algorithm used by the at least one controller for controlling the relative position between the lens group and image sensor.

15. The system of claim 1, the control system is further configured to store a record of the detected one or more instability events and corresponding remedial actions performed for mitigating the controller performance degradation associated with the detected one or more instability events.

16. The system of claim 1, wherein the one or more instability events include at least one of detachment of a viscoelastic material, fracture of a spring, or accumulation of electrostatic charges.

17. A method, comprising:
controlling a relative position between a lens group having one or more lenses and an image sensor of a camera system, using an actuator under control of at least one controller of a control system of the camera system in accordance with a first position control scheme;
monitoring one or more parameters associated with the controlling the relative position, using the control system;
detecting, based at least in part on analysis of the one or more parameters, one or more instability events associated with controller performance degradation; and
responsive to detecting the one or more instability events, switching from the first position control scheme to a second position control scheme, wherein the at least one controller controls the actuator differently using the second position control scheme relative to the first position control scheme.

18. The method of claim 17, wherein switching from the first position control scheme to the second position control scheme includes switching from a closed-loop control scheme to an open-loop control scheme.

19. The method of claim 17, wherein monitoring the one or more parameters includes monitoring at least one of the relative position between the lens group and image sensor, a current applied to the actuator, or a command of the current applied to the actuator.

20. A device, comprising:
a camera system comprising:
a lens group including one or more lenses;
an image sensor configured to generate image data based on light passing through the lens group;
an actuator configured to move at least one of the lens group or the image sensor; and
a control system including at least one controller; and
at least one processor configured to process the image data generated by the image sensor,
wherein the control system is configured to:
control a relative position between the lens group and image sensor, wherein, to control the relative position, the at least one controller controls the actuator in accordance with a first position control scheme;
monitor one or more parameters associated with control of the relative position;
detect, based at least in part on analysis of the one or more parameters, one or more instability events associated with controller performance degradation; and
responsive to detecting the one or more instability events, switch from the first position control scheme to a second position control scheme, wherein the at least one controller controls the actuator differently using the second control position scheme relative to the first position control scheme.

\* \* \* \* \*